United States Patent [19]

Kobayashi

[11] Patent Number: 5,021,273

[45] Date of Patent: Jun. 4, 1991

[54] METHOD AND APPARATUS FOR MAKING LABELS

[75] Inventor: Junichi Kobayashi, Tokyo, Japan

[73] Assignee: Ko-Pack (UK) Limited, Peterborough, England

[21] Appl. No.: 340,295

[22] PCT Filed: Sep. 30, 1987

[86] PCT No.: PCT/GB87/00687

§ 371 Date: Mar. 22, 1989

§ 102(e) Date: Mar. 22, 1989

[87] PCT Pub. No.: WO88/02308

PCT Pub. Date: Apr. 7, 1988

[30] Foreign Application Priority Data

Sep. 30, 1986 [GB] United Kingdom ................ 8623496

[51] Int. Cl.[5] ................................................ B32B 7/06

[52] U.S. Cl. ...................................... 428/40; 156/204; 156/227; 156/260; 156/264; 156/265; 156/384; 156/387; 156/277; 270/5; 270/8; 270/21.1; 270/41; 101/92; 101/174; 101/178; 101/212; 101/219; 428/41; 428/42

[58] Field of Search ............... 156/204, 227, 260, 264, 156/265, 510, 277, 384, 387; 428/40, 41, 42; 270/5, 8, 21.1, 41; 493/324, 356, 439, 959; 101/92, 174, 178, 212, 219

[56] References Cited

U.S. PATENT DOCUMENTS

| | | | |
|---|---|---|---|
| 3,284,077 | 11/1966 | Matuschke | 270/5 |
| 3,993,814 | 11/1976 | Cavender | 428/40 |
| 4,592,572 | 6/1986 | Instance | 428/40 |
| 4,744,591 | 5/1988 | Instance | 428/40 |

*Primary Examiner*—Caleb Weston

[57] ABSTRACT

A method and apparatus for making booklet type labels having at least one printed inner sheet includes apparatus for printing and assembling three webs which includes the provision of folding stations to enable a single web to be immediately and continuously folded after printing to produce one more inner label portions making up the booklet sheets. The press includes vertically stacked web support drums with associated printing stations wherein one of the drums is reversible to enable the simultaneous printing of two webs by the stack assembly including the printing of one web on both sides.

10 Claims, 3 Drawing Sheets

FIG.1
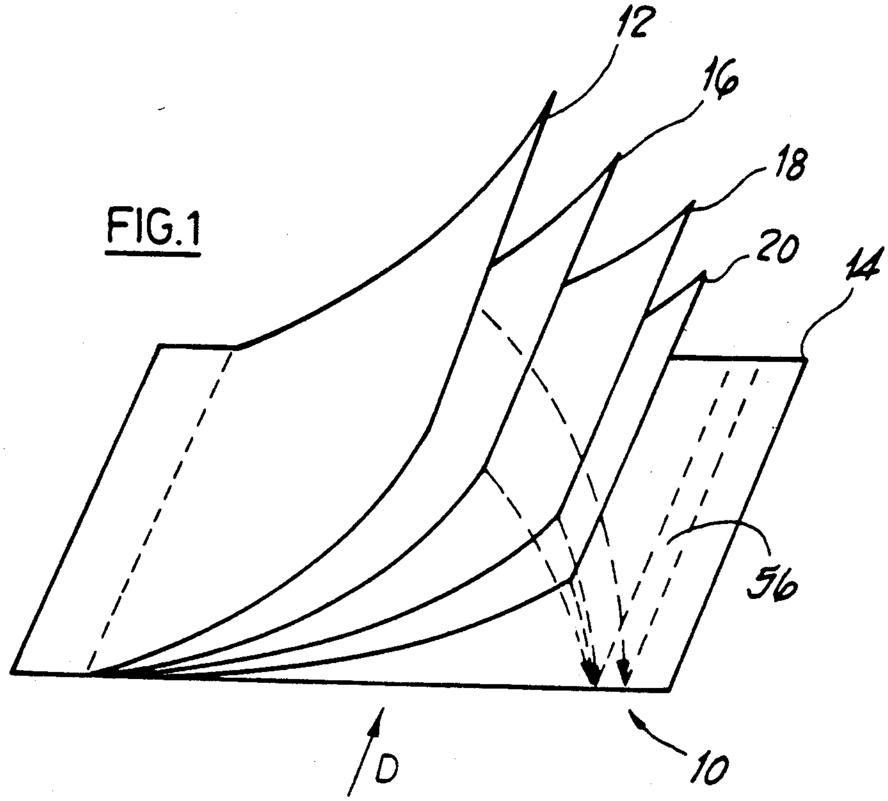
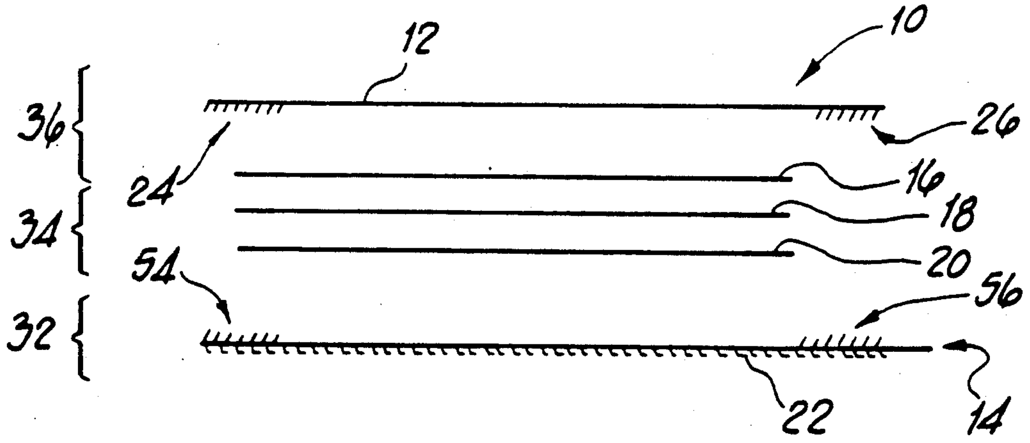
FIG. 2

METHOD AND APPARATUS FOR MAKING LABELS

This invention relates to a method and apparatus for making labels, particularly the so-called booklet-type labels in which there is a releasable outer label sheet and one or more printed inner label sheets forming a booklet.

Previously proposed apparatus for producing labels, particularly booklet-type labels has been subject to significant disadvantages, particularly with respect to their efficiency of operation and the complexity of the operations which the user is required to perform. For instance, there are disclosed in the following specifications, namely:

GB 2127378A; GB 2159118A; GB 2171386A; GB 2179020A; EP 0 154 057A; EP 0 161 914A; EP 0 192 444A;

apparatus and machines capable of making complex labels by assembling pre-printed webs and label components. However, the operation of such a machine necessitates the provision of pre-printed and assembled label components as a separate operation, and as a result the label manufacturing process becomes a multi-stage operation involving several sets of apparatus, transfer of product components between these and all these stages being attended by consequential efficiency penalties.

Printing apparatus exists for pre-printing individual components of multi-ply labels, one at a time. Such apparatus tends to be one sided and large and expensive and to require simple multiplication of the apparatus size in order to multiply colours and to print more than one web.

We have thus identified a considerable requirement for a method and apparatus for printing booklet-type labels offering one or more advantages in relation to matters discussed above, or generally.

According to the invention there is provided a method and apparatus for label manufacture as defined in the accompanying claims.

In an embodiment described below there is provided a label making press capable of printing and processing one, two or more webs of unprinted base label material. The press can continuously fold the material and can optionally trim it to sever the internal label sheets produced by the folding operation. In this way, at least one of the webs of label material produces at least two fold-joined or separated-by-trimming face-to-face label sheets in the finished label.

In the embodiments, perforation lines or bands of peelable adhesive may be provided to enable the various label portions to be separated from each other, or from an innermost label portion adhering to the product as a permanent product designation thereof, according to the user's requirements.

Embodiments of the invention will now be described by way of example with reference to the accompanying drawings in which:

FIG. 1 shows, somewhat diagrammatically, a first embodiment of a label produced by the method of the invention;

FIG. 2 shows, diagrammatically, an exploded side elevation view of the label of FIG. 1;

Figure 3:
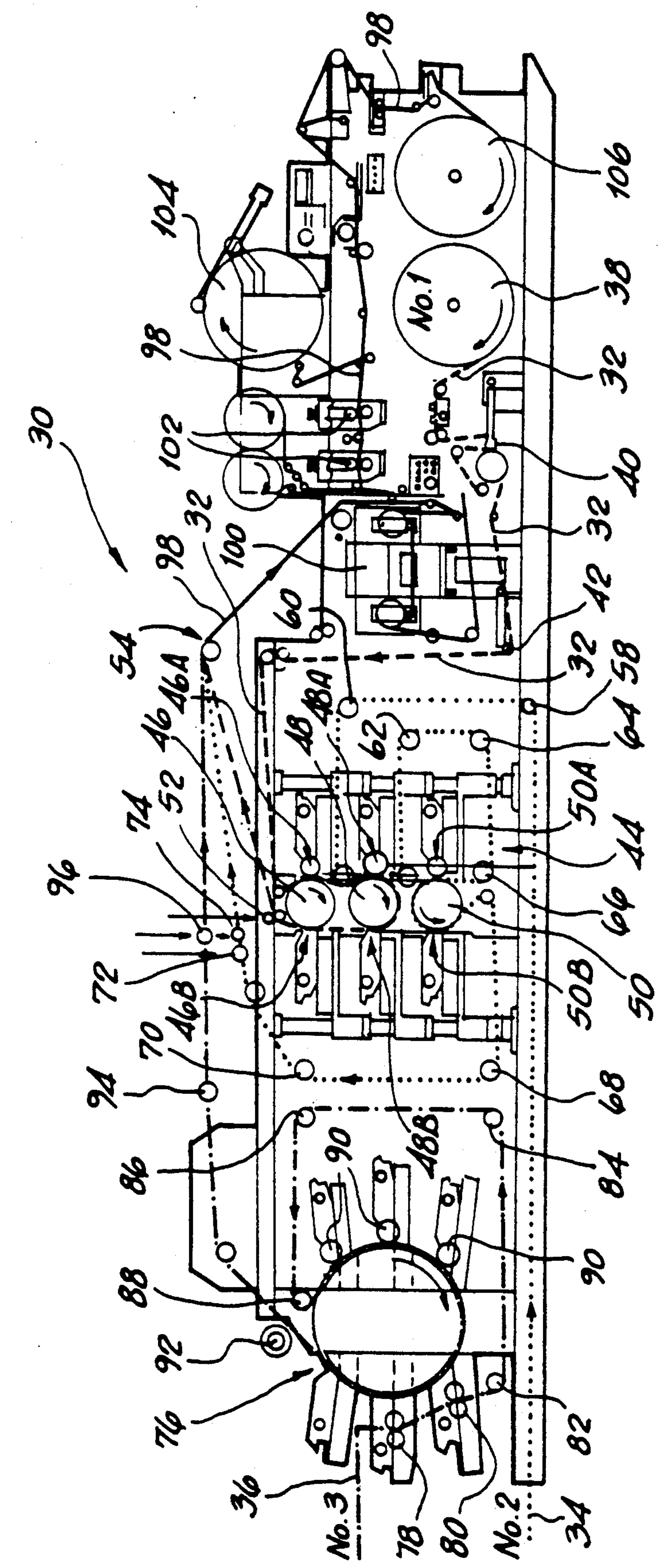
FIG. 3 shows a side elevation view of apparatus for manufacturing the labels of FIGS. 1 and 2.

As shown in FIGS. 1 and 2, a label 10 comprises an outer label member 12, a primary inner label member 14, and three secondary inner label members 16, 18 and 20. Label member 14 is coated with adhesive 22 across the full width of its lower surface and serves to secure the entire label assembly 10 to a product, not shown, and to identify same after removal of the remaining portions of the label during use as described below. Before application to the product the adhesive 22 is masked by a sheet of peelable release material, not shown.

Outer label member 12 is secured to inner label member 14 by two edge bands of adhesive 24 and 26. These bands releasably secure label member 12 to label member 14 whereby the former can be peeled away from the latter in use, as will be explained.

Sandwiched between the outer and inner label members are three secondary inner label members 16, 18 and 20 which are secured at their left hand edges (as seen in FIG. 2) by the adhesive band 24 on outer label member 12. Only the uppermost inner label member 16 actually contacts adhesive band 24 over part of a plane face, but all three are effectively secured thereby. At the opposite, righthand edges of the secondary inner label members, the latter terminate just short of adhesive bands 26, and in the assembled label are simply mechanically secured by the overlapping relationship of the outer label member 12 with them. The primary inner label member 14 projects a short distance beyond the edge of outer label member 12 in the assembled condition of the label, thereby facilitating commencement of peeling of the latter by a user.

In use, the label assembly initially has adhesive bands 24 and 26 securing outer label member 12 to primary inner label member 14 with the three secondary inner label members 16, 18 and 20 sandwiched between them, and all four layers of sheet material in contact with each other. The user peels away adhesive band 26 to release outer label member 12. The user may then, if it is wished, also peel away adhesive strip 24, thereby permitting complete removal of outer member label 12. The secondary inner label members 16, 18 and 20 are then readily removed altogether, or one after the other, thereby leaving primary inner label member 14 adhered to the product and providing a designation thereof.

So far as printed matter is concerned, printing may be effected on both sides of members 12, 16, 18 and 20, and on the outer side of member 14 making a total of nine printed faces altogether. This permits a large amount of information and/or marketing or promotional matter to be readily provided. Details of the printing processes are discussed below. It is to be noted that by providing suitable materials for the label members, printing may even be effected internally of the assembled label by means of printing apparatus applied to the exterior of the assembly and which does not mark the exterior thereof. Such a result may be achieved by use of carbonless duplicating sheet material as the secondary inner label members, or by use of equivalent materials. In this way, the retailer, for example, may add printed information to a label to supplement the basic information originally printed on it. It will be understood that usually the inner and outer label members 14 and 12 will both be printed with the same or similar product designations so that when the outer label member is removed, together with the secondary inner label members 16, 18 and 20, the product remains suitably identified.

FIG. 3 shows apparatus 30 for manufacturing the labels 10 of FIGS. 1 and 2. Broadly, apparatus 30 is arranged to print and assemble in superimposed relationships three webs 32, 34 and 36. Web 32 provides the back of the label, namely primary inner label portion 14, together with the associated peel-off backing layer of silicone paper, not shown. Web 34 provides two of the secondary inner label portions 18 and 20, and web 36 provides the outer label member 12 and the other of the secondary inner label members 16. This relationship is indicated in FIG. 2.

Web 32 proceeds from a roll 38 in an unwind station, through automatic dancer roll tension control means 40 to a guide roller 42 and hence upwardly and laterally to printing apparatus 44 comprising three web support drums 46, 48 and 50, each having two horizontally opposed printing stations 46A, 46B and 48A, 48B and 50A, 50B. Web 32 is guided by rollers so as to pass successively through printing stations 46A, 48A, 48B and 46B and thence via a glueing station 52 to a web assembly station 54. At the glueing station 52 two bands of adhesive 54, 56 are applied to the primary inner label member 14 as shown in FIG. 2. These bands of adhesive correspond to the bands 24 and 26 described above. It is not necessary to provide both sets of bands. It is more convenient to provide the bands 54 and 56. The direction of travel of the web in the apparatus 30 of FIG. 3 is indicated in FIG. 1 by the arrow D.

As regards web 34, this is likewise drawn from a roll (not shown) from which it proceeds in the path indicated via guide rollers 58 and 60 to printing station 48A. At this stage it is printed on one side as it passes through the printing station 48A on top of web 32. Then it proceeds via guide rollers 62 and 64 and 66 to printing station 50A and then to printing station 50B, both of which print the opposite side of the web as compared with the printing station 40A. Then the web proceeds via rollers 68 and 70 to a folding station 72, a perforating station 74 and thence to assembly station 54. At the folding station 72, the single web 34 is folded in half so as to make the two layers 18 and 20 of the label assembly. The folding means at the folding station includes guide and roller means arranged to smoothly intercept and progressively direct and guide into a folded attitude a portion of the moving web. Roller means (not shown) may be provided to complete the folding action by applying a degree of compression to the doubled-over assembly.

A continuous cutting station is also provided to separate the two halves of the folded web, but this is not shown. In this embodiment, the perforating station is not employed. It may be used to provide, for example, perforated lines to assist detaching the inner label members 16, 18 and 20. Indeed, perforation lines and lines of peelable adhesive may be used interchangeably in the label according to the needs of the user.

As regards web 36, it will be seen that it is printed in a single drum six-station printing unit forming an integral part of press 30. The web is printed on its back or reverse side at printing stations 78 and 80. It then proceeds via guide rollers 82, 84, 86 and 88 to the principal printing stations 90 of press unit 76, which prints the front side of web 36. From the drum of press 76, web 36 passes via a varnishing station 92 to a folding station 94. This latter is constructed and operates much in the same way as folding station 72. Then the web passes to a perforating station 96 and on to assembly station 54.

At the folding station, the outer label member 12 is folded with respect to the inner label member 16 and a cutter (not shown) severs the two prior to final assembly at station 54. Perforating station 96 permits, optionally, provision of perforation lines for security purposes. Such provision enables, in association with appropriate types of adhesives, the use of an arrangement in which a label cannot be re-closed after opening. This may be important for certain security applications. From assembly station 54, the combined web 98 passes to various finishing stages including flat bed die cutting apparatus 100 and rotary die stations 102, after which the unwanted die-cut material is removed onto a roll 104. The finished web of separate labels supported on a continuous backing of release material is then wound on to a rewind roll 106.

It is particularly to be noted that the web support drum 50 can be rotated either in the same direction as drums 46 and 48, for use in combination with the other two drums to provide a six-station printing assembly for one side of a web. Or, drum 50 can rotate in the direction shown in FIG. 3 for the purposes described above whereby simultaneous printing of web 32 on its opposite sides is achieved.

Figure 4:
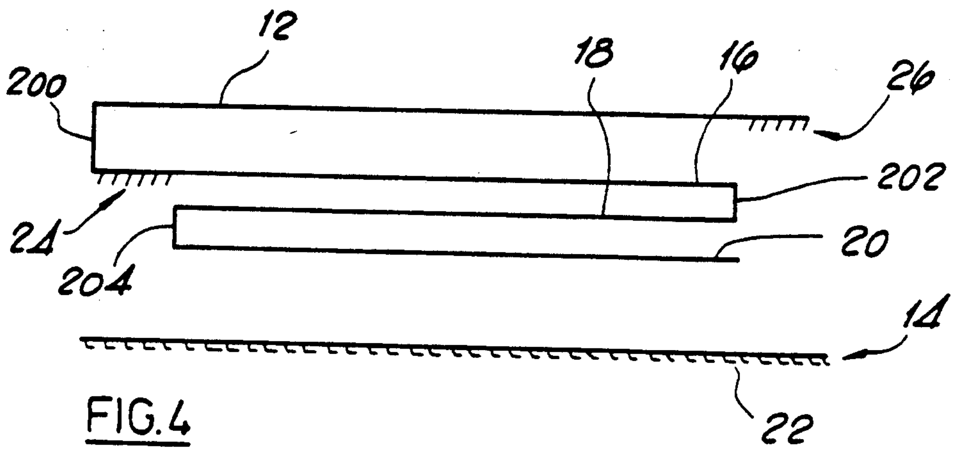
FIGS. 4, 5 and 6 show, diagrammatically, three further label constructions which can be produced by the apparatus of FIG. 3.
Figure 5:
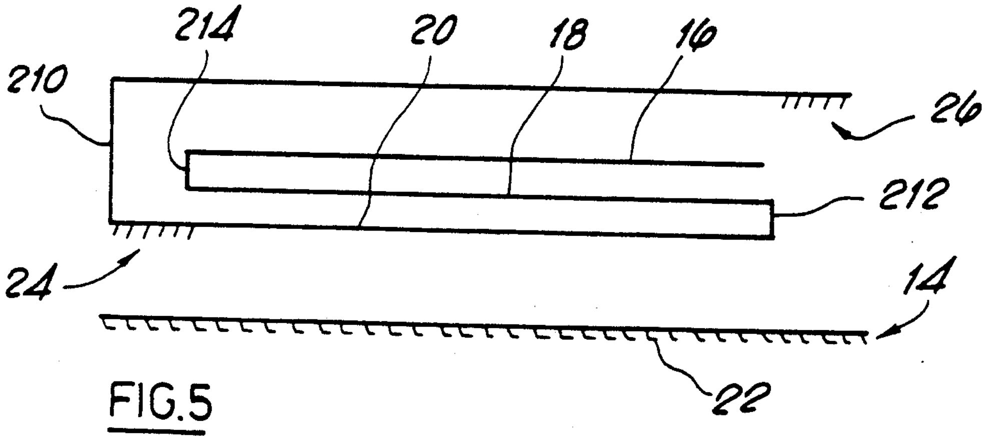
Figure 6:
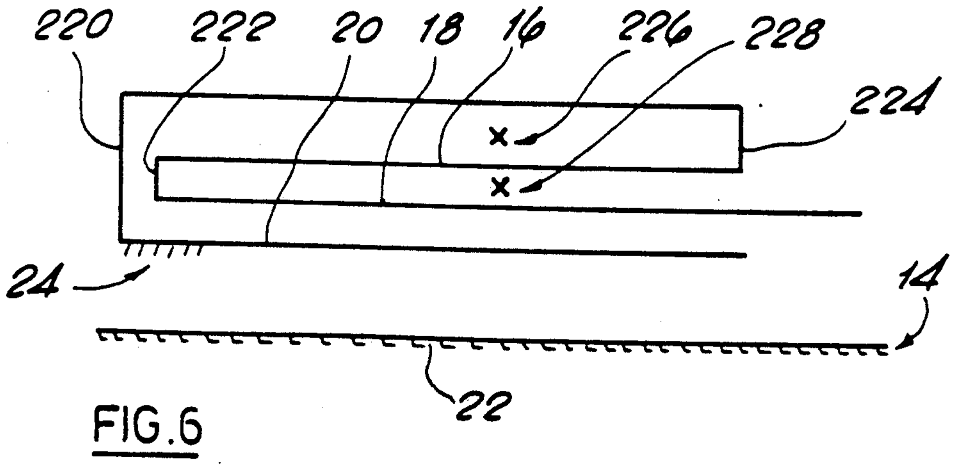

Turning now to the embodiments of FIGS. 4, 5 and 6, it will be noted that these figures show, in views similar to that of FIG. 2, modifications of the label assembly 10 of FIGS. 1 and 2. In FIGS. 4, 5 and 6 the label portions common to FIGS. 1 and 2 are given the same reference numerals as in FIGS. 1 and 2, and the differences will be described. In FIG. 4, the main difference lies in the provision of portions 200, 202, 204 joining the web portions 12, 16, 18 and 20 as a continuous folded assembly. Of course, these joins are in fact fold lines and do not have the depth shown in the diagrammatic figures for the purposes of illustration. In this embodiment, the adhesive band 24 is located on inner label portion 16.

In the embodiment of FIG. 5, the same basic label portions have been joined at 210, 212, 214 in a different way, but with a similar function. The above comment with respect to the fold lines applies here also.

In FIG. 6, a further variation of the arrangement of fold lines 220, 222, 224 is shown. The main difference from the preceding embodiments lies in the elimination of adhesive band 26 and the substitution of a single central adhesive spot 226 and/or 228 as shown between the laminae of the label. Such an adhesive spot is located centrally between the side edges of the label, is small enough not to interfere with the text or graphic matter printed thereon, and is of a peelable adhesive providing sufficient adherence to hold the label assembly together. The adhesive spots are applied to the web in the form of a lengthwise line of spaced adhesive spots.

It will be understood that the embodiments of FIGS. 4, 5 and 6 can be readily produced by the apparatus of FIG. 3 by minor variations of the action of the folding stations and with elimination of the trimming action which severs the edges of the folded web portions 16, 18 and 20 in the embodiment of FIGS. 1 and 2.

Among the advantages provided by the embodiments described above are the following. Firstly, the label manufacturing process is extremely simple and rapid and cost effective since it can be performed on a continuous basis with a minimum of supervision and manual labour, and within the compass of a single relatively compact machine. The label assembly can have a large amount of printed information provided therein on both sides of most portions of the label. This can be supplemented by local printing by the label user. The product itself remains properly designated by means of the innermost label member 14.

Among other modifications which could be made in the above embodiments the inner label member 14 may be dispensed with for certain applications. In such a case, the adhesive bands 24 and 26 serve to adhere the label assembly directly to the product, and the adhesive bands, or one of them, may be arranged to be re-sealable so that after removal or inspection of the inner label members 16, 18 and 20 the outer label member may be re-adhered to the product to continue to provide product designation. Obviously, many variations can be made in the form and materials of the inner and outer label members according to particular requirements, and these can be met by suitable die-cutting and related operations. The manufacturing process is extremely versatile. Any suitable materials may be employed for the label members, including plastic sheet materials, plain paper rolls and composite materials.

I claim:

1. A method of making multiple-part printed labels (10) each comprising at least a printed and releasable outer label member (12) together with one or more printed inner label members (16, 18, 20) which are rendered accessible in use on a product by releasing one edge of said outer label member, the method comprising providing one or more webs (32, 34, 36) of label material, and feeding said label material lengthwise while assembling same to enable labels to be obtained from the assembled web or webs of label material; characterised in that said method comprises the step of printing said label material with text or other material required for said labels continuously immediately prior to assembling said web or webs, said printing step producing a printed web of label material; and said method comprising the subsequent step of continuously folding at least said printed web in a lengthwise direction with respect to said feed direction to produce a folded web portion providing said inner label members fold-joined to an adjacent web portion (12), said web portions being in generally fact-to-face relation, and the step of continuously applying an adhesive (24, 26, 54, 56) to at least said printed web, said method further comprising the step of subjecting the said folded web to a separating or cutting action at spaced locations and in mutually parallel directions generally transverse to said lengthwise direction to produce individual mutually parallel labels arranged side by side along the length of the web.

2. A method according to claim 1 characterised in that said step of continuously folding said inner label members fold-joined to an adjacent web portion (12) produces at least three folded web portions (12, 16, 18, 20) which are fold-joined (200, 202, 204) to each other as well as to said adjacent web portion (12), whereby the corresponding labels have at least two fold-joined inner label portions.

3. A method according to claim 1 characterised in that at least two webs (32, 34, 36) of label material are provided for printing and each of said two webs is subjected to said continuous folding operation after printing, a first one (36) of said two webs providing said outer label member (12) and at least one inner label member (16) in edge-joined face-to-face relationship, and the second (34) of said webs providing at least two further inner label members (18, 20).

4. A method according to claim 2 characterised by the step of providing cutting means to effect separation of said folded web portion or portions (16, 18, 20) from each other and from said adjacent web portion (12), said cutting means being arranged to cut the web in said lengthwise direction.

5. A method according to claim 4 characterised by the step of providing a further web (32) of label material for printing, and printing and feeding same lengthwise, and assembling same with the other web or webs to enable said labels (10) to be obtained from the assembled webs, said further web providing an innermost label member (14) to provide a product designation after removal of the other portions of the label, the method comprising the step of continuously applying adhesive (22) to said further web to adhere the inner face of said innermost label member to a product, and said further web comprising a web portion of release material to cover the adhesive before application to a product.

6. A method according to claim 5 characterised in that said step of applying adhesive to said web comprises applying at least one band of adhesive (54, 56; 24, 26) to the web to adhere at least one end portion of said outer label member (12) to said innermost label member (14).

7. Apparatus for making multiple-part printed labels of the kind comprising at least a printed and releasable outer label member (12) together with one or more printed inner label members (16, 18, 20) which are rendered accessible in use on a product by releasing one edge of the outer label member, said apparatus being characterised by comprising printing apparatus (44) for printing said label material and includes at least two drivable web support members (46, 48, 50) together with respective printing stations (46A, 46B, 48A, 48B, 50A, 50B), at least two printing stations being provided on at least one of said drivable web support members, each of said drivable web support members being drivable in the same direction, and at least one (50) of said drivable web support members being reversible in direction, and web guide means (62, 64, 66) being provided to introduce the same web to said reversible web support member and its printing station or stations (50A, 50B), whereby said web is simultaneously printed on opposite sides thereof as it passes over said drivable web support members in succession as they contra-rotate, or is printed on one side only as they co-rotate.

8. Apparatus according to claim 7 characterised in that said printing apparatus comprises three vertically stacked web support rollers, (46, 48, 50) forming said web support means, and respective associated printing stations, adjacent ones (46, 48) of said rollers being arranged to co-rotate for printing a first web (32) on one side thereof, and the third roller (50) being arranged to contra-rotate with respect thereto for effecting printing of a second web (34), and web guide means (58, 60) being provided whereby said second web is presented for printing on one side at the one (48) of said co-rotating rollers (46, 48) which is adjacent said third roller (50), and said second web being thus printed while in superimposed relation to said first web (32), and said second web being then presented for printing on its other side at said third roller (50).

9. Apparatus according to claim 7 characterised by supply means for simultaneously and continuously supplying three webs of label material (32, 34, 36), simultaneously colour printing said three webs, applying adhesive thereto and assembling same as a roll (106) of finished labels.

10. A label (10) comprising an innermost label member (14), said innermost label member having a layer of adhesive (22) for permanently securing the label to a surface of an object, a releasable outermost label member (12) mounted in superimposed relation to said innermost label member and releasably secured thereto, and at least one printed inner label member (16, 18, 20) located between said innermost and outermost label members, characterised in that said inner label member or members is provided as a separate sheet from said outermost label member and is releasably secured in the label by peelable bands of adhesive (24, 26, 54, 56) located on opposed end portions of said innermost and/or outermost label members, which end portions of said innermost and/or outermost label members project beyond the adjacent edges of the inner label member for mutual adhesive engagement.

* * * * *